United States Patent Office 3,408,328
Patented Oct. 29, 1968

3,408,328
SULPHUR PHENOPLASTS AND THE
OBTAINING THEREOF
Yves Labat, Gelos, France, assignor to Societe Nationale des Petroles d'Aquitaine, Paris, France
No Drawing. Filed Jan. 18, 1965, Ser. No. 426,429
Claims priority, application France, Jan. 21, 1964, 960,999
10 Claims. (Cl. 260—48)

ABSTRACT OF THE DISCLOSURE

Polymeric materials are produced by the condensation of phenols with dithiol polythioethers. These materials have a sulphur content which varies between 15 to 40% by weight and which are partially soluble in organic solvents and alkaline solutions. The products produced by this process are useful in the formation of heat hardenable materials which have properties comparable to those of phenol formaldehyde resins.

---

The present invention relates to a process for the preparation of condensation products of phenols with dithiol polythioethers. It also covers the new products as thus obtained and particularly new phenoplasts containing sulphur.

The preparation of condensation products of phenols, formaldehyde and hydrogen sulphite has long been known; more particularly, it is known to prepare resins with a base of sulphur, phenol and formaldehyde. However, the known products are not very well defined and their use as plastic materials has not met with any great success, the properties of these materials not being very interesting.

On the contrary, the present invention makes it possible to obtain materials which are much better defined and the properties of which are of interest for a certain number of uses. The new condensation products do in fact make it possible to prepare heat-hardenable materials having properties comparable to those of phenol-formaldehyde resins. The invention renders possible the preparation of readily melting resins which are partially soluble in the usual organic solvents and in alkaline solutions. It is possible to make the sulphur content in these products to vary from about 15 to 40%.

The new process according to the invention consists in causing a dithiol polythioether to react with one or more phenols in such a way as to condense these two reagents with release of hydrogen sulphide.

In practice, according to one particular embodiment of the invention, the dithiol polythioethers employed are of the $HS(CH_2S)_nH$ type, the number $n$ of groups being generally between 2 and 7. These dithiol polythioethers are preferably liquid oligomers which are more or less viscous at normal temperature.

One particularly convenient form of the invention consists in using liquid oligomers in which $n$ has a value from 3 to 4 and of which the molecular weight is in the region of 190.

The condensation according to the invention of the phenols with the aforementioned liquid oligomers is carried out at temperatures which vary from 45° to 180° C., in the presence of a catalyst of which the content is usually of the order of 0.1 to 10% by weight of the reaction mixture.

The condensation is effected with anhydrous reagents taken in the form of a liquefied mixture.

As catalyst, it is possible to employ the bases, preferably the low organic bases and particularly the secondary aliphatic amines.

As in the manufacture of phenol-formaldehyde condensation products, different phenols can be employed but above all those of which the ortho and/or para positions are free, i.e., are not substituted. Thus, phenols such as hydroxybenzene, metacresol, paracresol, alkylated phenols, for example, those of which the alkyl contains 2 to 4 carbon atoms, resorcinol, etc., are suitable for carrying out the present invention.

In practice, it is possible to condense variable quantities of dithiol polythioether on phenol; these quantities may be very small, particularly 0.1 mol per mol of phenol, or they may even reach 1.5 mols and more of oligomer to 1 mol of phenol.

Nevertheless, one particular feature of the invention consists in operating with a slight excess of phenol or with a quantity of oligomer at most equal stoichiometrically to that of the phenol, taking into account all the reactive positions of the phenol, that is to say, the unsubstituted ortho, para and/or meta positions. This method of procedure avoids having a too large quantity of phenol which has not reacted when the reaction is completed; on the other hand, the danger of obtaining products containing chains of homopolymerised oligomer is avoided, and also that of the formation of a three-dimensional lattice. The use of a slight excess of phenol thus avoids the conditions capable of leading to products which cannot be used as moulding powders.

In the embodiment of the invention which uses a slight excess of phenol, the preferred proportions are 1 to 2 mols of dithiol polythioether oligomer to 2 mols of phenol.

On the other hand, the inventor has found that it is advantageous to stop the condensation reaction when 80 to 85% of the phenol has been condensed. If the reaction is continued beyond this limit, a thermo-setting resin is obtained which solidifies in the reactor; the final product no longer contains oligomer, even if its initial proportion is equal to or larger than that of the phenol.

The period of the reaction is regulated as a function of the quantity of hydrogen sulphide which is liberated; the liberation of $H_2S$ stops when the reaction of the terminal —SH— groups of the oligomer with the hydrogen of the phenolic nucleus is complete.

The invention also comprises the hardening of the sulphurised phenoplasts obtained by the process as described above. This transformation of the resin may be carried out by means similar to those which are used in the hardening of the known phenol-formaldehyde resins; in particular, one method of effecting the hardening consists in causing the new sulphurised phenoplasts to react with substances which generate active methylene groups, such as for example polymethylene polyamines and more especially hexamethylene tetramine.

The new products according to the invention, which are obtained by the condensation of a dithiol polythioether $HS(CH_2S)_nH$ with a phenol, correspond to the formula:

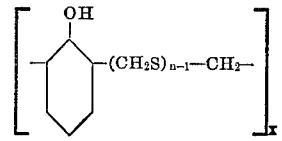

which represents one of the units of the condensation product, this being repeated $x$ times in the molecule of the resin which is obtained. These compounds no longer contain an uncombined SH function, each molecule being terminated by two monosubstituted phenolic rings, except where $x$ is 1, in which case it is clear that the sulphurated chain terminates on both ends upon the phenolic moiety. The number $x$ may assume high values, but it is generally between 1 and 6, depending on the degree of condensation. The number $(n-1)$ of —$CH_2S$— groups in the said unit is from 1 to 6 when starting with oligomers of which n is 2 to 7 and when the condensation occurs on a single hydrogen of the phenol without homopolymerisation of the oligomer. When other positions of the phenol occur particularly the para and/or meta positions, and in the case of the homopolymerisation of the dithiol polythioether—which occurs particularly when this latter is in excess with respect to the phenol—the number of —$CH_2S$— groups per unit may be much higher, for example 7 to 32.

Depending on the nature of the initial phenol or phenols and the dithiol polythioether which is used, the new condensation products are obtained in the form of a more or less solid wax or in the form of hard resinous masses, the majority of which can easily be ground.

In the stage as mentioned above, that is to say, with relatively low values for $x$, the resins which are obtained can be readily melted and are partially soluble in the normal organic solvents. Their sulphur content may be from 15 to 40% by weight, depending on the degree of condensation and the proportion of dithiol polythioether used in the preparation of the condensation product.

The present invention also includes the hardened resins of which the total composition is that of the condensation products as described above, but in which all or part of the free ortho and/or para positions of the phenolic rings which are present are substituted by other groupings, particularly methylene groups.

The new condensation products according to the invention can be employed for the manufacture of moulded articles, varnishes, etc., and loading agents or other adjuvants can be incorporated thereinto in the usual way.

In order to illustrate the invnetion, a number of non-limiting examples are given below.

EXAMPLE 1

2 mols of phenol, 188 g., and 1 mol of oligomer, 190 g., liquid at 45° C. are mixed in a reactor which is equipped with a reflux condenser and a pipe for the passage of a current of nitrogen. 3% of diethylamine related to the phenol, are then added, and the mixture is slowly brought to about 160° C. At the end of 3 hours, 1.7 to 1.8 mols of $H_2S$ are liberated. The rate of conversion of the phenol is 62%.

The uncombined phenol is then eliminated by vacuum distillation.

The resin obtained is light yellow and contains 28% of sulphur. It may be crosslinked with hexamethylene tetramine.

EXAMPLE 2

The example is carried out under the same conditions, but with twice the quantity of catalyst, i.e., 6% related to the phenol. 1.80 to 1.90 mols of $H_2S$ are liberated in 4 hours, and the conversion rate of the phenol is 70%.

EXAMPLE 3

Example 1 is repeated with 2 mols of phenol and 1 mol of oligomer in the presence of 6% of diethylamine with respect to the phenol. The reaction takes place at temperatures from 45 to 160° C. for 2½ hours. 1.6 molecules of $H_2S$ are then liberated and the phenol conversion rate is 62%.

The temperature is then lowered to 80 to 90° C. and a fresh molecule of oligomer is added. When the oligomer-resin mixture is achieved, the temperature is progressively raised to 160° C. to 165° C.

The reaction is stopped after a total period of 6½ hours. A total of 3.5 mols of $H_2S$ has been liberated and the phenol conversion rate is 85%.

The resin obtained is light yellow and can easily be ground.

EXAMPLES 4 TO 7

| No. of the example: | Catalyst | Phenol | Total oligomer | $H_2S$ total in 6 hours | Phenol conversion rate | Resin S, percent |
|---|---|---|---|---|---|---|
| 4 | Diethylamine | 2 | 1.5 | 2.5 | 80 | 31 |
| 5 | do | 2 | 2.5 | 3.8 | 88 | 39 |
| 6 | do | 2 | 3 | 4.2 | 88 | 40 |
| 7 | Dibutylamine | 2 | 2 | 3.5 | 87 | 38 |

The above examples are carried out in accordance with the working method described in Example 3.

EXAMPLE 8

In Example 5, the 2 molecules of phenol (hydroxybenzene) are replaced by 2 molecules of metracresol and the other working conditions are maintained. The reaction proceeds in identical manner. 3.5 mols of $H_2S$ are liberated and the phenol conversion rate is 87%. A clear resin containing 37% of sulphur is obtained.

EXAMPLE 9

The resin obtained in Examples 2 to 8 is finely crushed and mixed with 10% of hexamethylene tetramine; the mixture is moulded at 170° C. at a pressure of 250 kg./cm.$^2$.

The moulded articles are infusible, light yellow in colour and odourless. They are not attacked either by the normal organic solvents or by acids. As regards the bases, only 10% caustic soda is absorbed by these articles at the rate of 1.5% in 10 days.

I claim:
1. Process for the preparation of novel phenoplasts containing sulphur, characterized thereby that a phenol is heated with a dithiopolyether whereby hydrogen sulfide is liberated, and wherein
   (1) at least one of the positions on the phenol nucleus ortho or para to the hydroxy group is unsubstituted,
   (2) the dithiol polythioether has the formula

$$HS(CH_2S)_nH$$ 

where $n$ has a value from 2 to 7,
   (3) the reaction is carried out in the anhydrous liquid state,
   (4) the reaction is carried out in the presence of from 0.1%–10% by weight of an aliphatic amine catalyst,
   (5) the reaction is carried out at a temperature of between 45° to 180° C.

2. Process according to claim 1 wherein $n$ has a value between 3 and 4.

3. Process according to claim 1 wherein the phenol is a member of the group hydroxybenzene, metacresol, paracresol, ethylphenol, propylphenol, butylphenol and resorcinol.

4. Process according to claim 1 wherein the proportion of dithiol polythioether to the phenol is between 0.1 to 0.5 mol per mol.

5. Process for the hardening of the condensation product formed in accordance with claim 1 which comprises heating said product in admixture with a substance which generates alkylene groups.

6. Process according to claim 5 wherein the alkylene generating substance is hexamethylene tetramine.

7. A phenoplast having the general formula

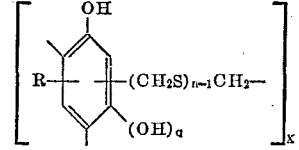

wherein the sulphurated side chain is bonded to the ortho or para position of the phenolic nucleus, $n$ is 2 to 32,
$x$ is 1 to 6,
R is hydrogen or lower alkyl, and
$q$ is 1 or 0.

8. Product according to claim 7 wherein $n$ is between 7 and 32.

9. An infusible phenoplast insoluble in organic solvents, formed by heating a phenoplast of claim 7 in a polyalkylene amine.

10. A process of claim 1, characterized thereby that the condensation is effected in several stages, a new portion of dithiol polythioether being added to the phenol in each of the stages.

References Cited
UNITED STATES PATENTS

| | | | |
|---|---|---|---|
| 2,035,098 | 3/1936 | Seaman | 260—48 |
| 2,771,431 | 11/1956 | De Groote et al. | 252—338 |

FOREIGN PATENTS

| | | |
|---|---|---|
| 1,330,819 | 5/1963 | France. |

OTHER REFERENCES

Gould Phenolic Resins, 1959, pp. 27–28, 36, and 44–46.

WILLIAM H. SHORT, *Primary Examiner.*

H. SCHAIN, *Assistant Examiner.*